INVENTOR
HARRY B. CALVERT
BY Hofmann and Yount
ATTORNEYS

July 15, 1969 H. B. CALVERT 3,455,354
VENEER LATHE

Filed May 23, 1966 6 Sheets-Sheet 3

INVENTOR
HARRY B. CALVERT

BY Hoffmann and Yount
ATTORNEYS

INVENTOR
HARRY B. CALVERT

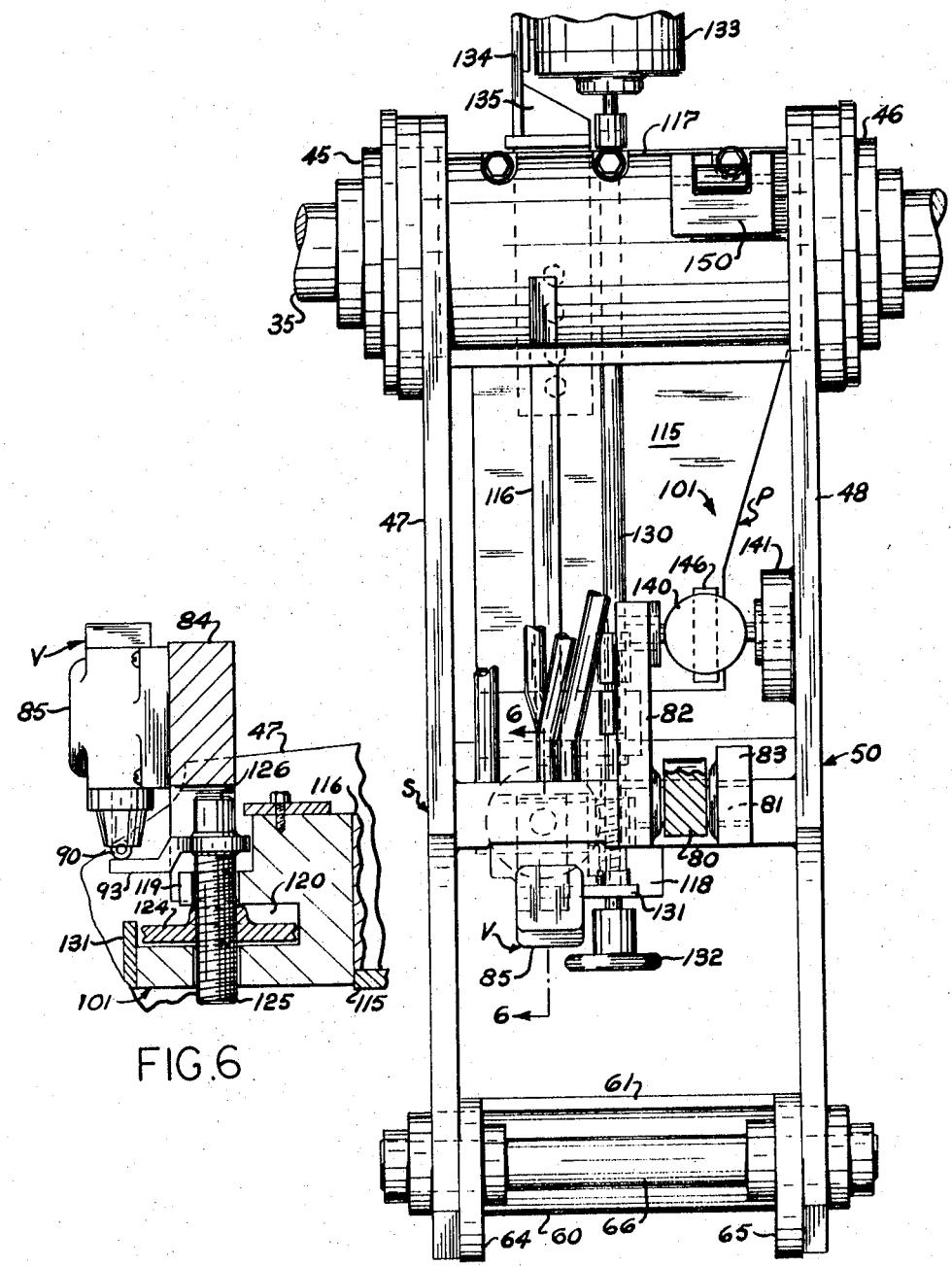

July 15, 1969   H. B. CALVERT   3,455,354
VENEER LATHE
Filed May 23, 1966   6 Sheets-Sheet 6

INVENTOR
HARRY B. CALVERT

BY *Hoffmann and Yount*
ATTORNEYS

United States Patent Office 3,455,354
Patented July 15, 1969

3,455,354
VENEER LATHE
Harry B. Calvert, Hespeler, Ontario, Canada, assignor to
The Coe Manufacturing Company, Painesville, Ohio, a
corporation of Ohio
Filed May 23, 1966, Ser. No. 552,170
Int. Cl. B27c 7/00
U.S. Cl. 144—209                                                3 Claims

ABSTRACT OF THE DISCLOSURE

A veneer lathe having log steady means supported from the lathe frame and engageable with the circumference of the log at a location spaced axially from the chucks and circumferentially from the knife and repositionable towards and from the axis of the log in slave relationship to the movement of a control member engageable with the periphery of the log adjacent to one end thereof and movable transversely of the axis of rotation of the log, and which position is adjustable so that a desired preload can be applied to the log.

Field of invention

The present invention relates to the turning or cutting of relatively long workpieces in a lathe and more particularly to the "peeling" of logs to make veneer.

During the turning of long pieces of work, such as, the peeling of a log in a veneer lathe, the work tends to climb upward on the tool due to the forces exerted on the work by the tool. As the size of the work is reduced these pressures, unless counteracted, flex the workk deleteriously, etc. In the case of a log, these forces cause the log to become barrel-shaped or hourglass-shaped and/or the log to oscillate and the veneer produced to be non-uniform in thickness, wrinkle and/or curve transversely of its length and to have poor surface qualities. The flexing of the log may be aggravated by the axial pressures exerted on the ends of the log by the lathe chucks.

One of the principal objects of this invention is the provision of an effective support or apparatus providing an effective support for steadying a log being peeled such that flexing or bowing and vibration of the log will be prevented and the diameter of the log will be or will remain uniform or substantially uniform from end to end throughout the peeling operation thus permitting smooth uniform cutting.

Another of the principal objects of the invention is the provision of a novel and improved veneer lathe having a support or back-up assembly adapted to engage a log being peeled intermediate the end of the log, preferably midway between the ends of the log, and means including a follower member for directly sensing the diameter of the log adjacent to at least one of its ends for causing the back-up assembly to be urged to a controlled position relative to the axis of rotation of the spindles which position progressively advances as the peeling operation proceeds in combination with means for adjusting the position to which the back-up assembly is urged whereby it can be located a deired distance within the circumference of the log and a controlled preload to be applied to the log.

Another object of the invention is the provision of a novel back-up apparatus for a veneer lathe which back-up apparatus includes a power actuated back-up assembly adapted to engage a log being peeled and carried between the spindle of the veneer lathe intermediate the ends of the log and means adapted to constantly urge the back-up assembly to an adjustable predetermined position relative the axis of rotation of the spindles of the lathe and within the circumference of the log which position is a function of the log diameter.

Another object of the invention is the provision of a power-actuated back-up assembly adapted to engage a log supported between the spindles of a veneer lathe intermediate the ends of the log in combination with means including a follower assembly adapted to engage the log adjacent to at least one of its ends for causing the back-up assembly to constantly seek a predetermined position within the circumference of the log relative to the follower assembly, and means for adjusting the position relative to the circumference of the log whereby a preload can be applied to the log.

The invention resides in certain constructions and combinations and arrangements of parts and further objects and advantages will become apparent to those skilled in the art to which it relates from the following description of the preferred embodiment described with reference to the accompanying drawings forming a part of this specification, in which similar reference characters designate corresponding parts, and in which:

FIG. 5 is a fragmentary plan view of the apparatus shown in FIG. 4;

FIG. 6 is a fragmentary sectional view, with portions in elevation, approximately on the line 6—6 of FIG. 5;

Figure 1:
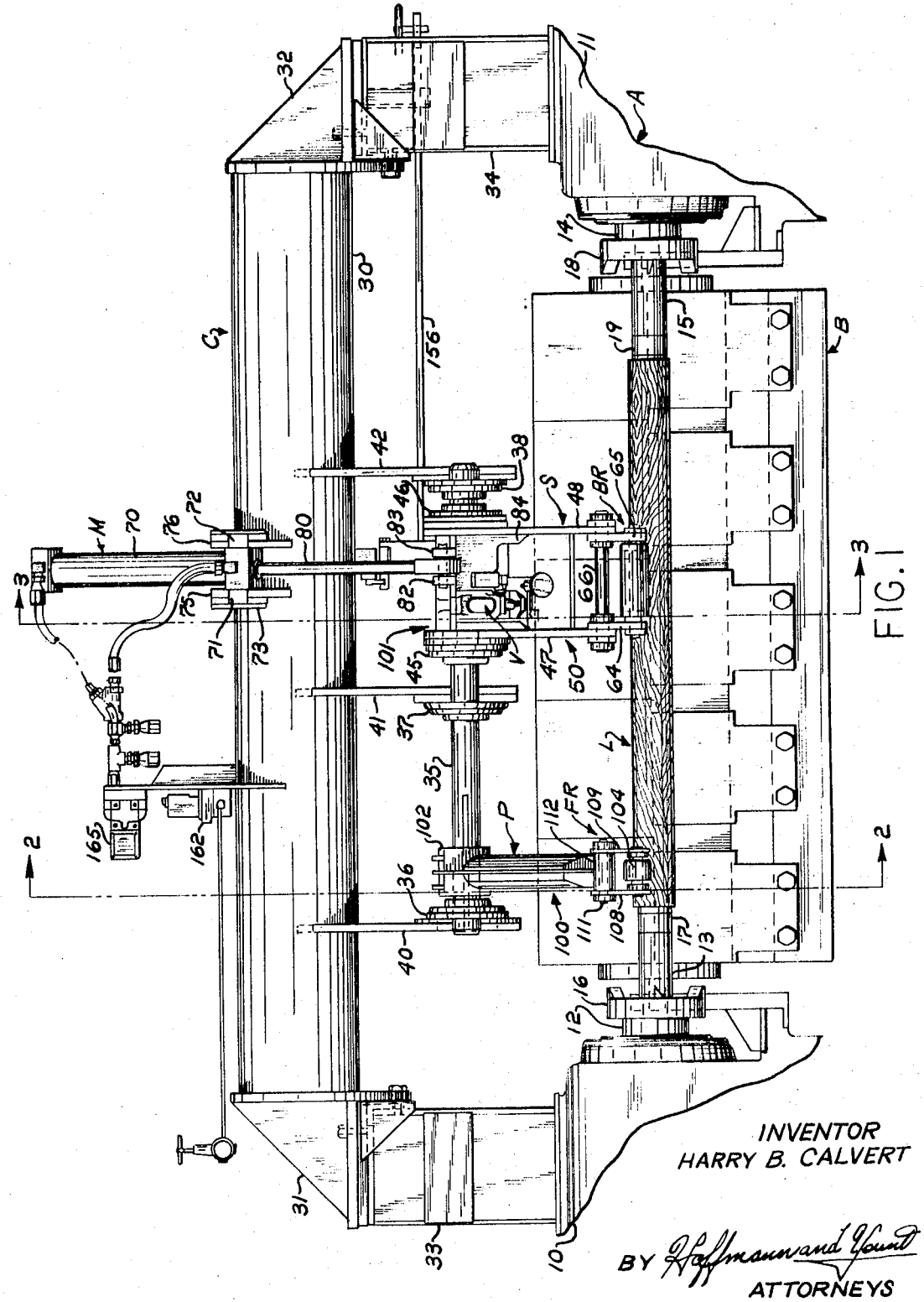
FIG. 1 is a fragmentary front elevational view of a veneer lathe embodying the present invention.

While the invention is susceptible of being variously embodied, the preferred embodiment is shown in the drawings and herein described in detail. It is to be understood, however, that there is no intension to thereby limit the invention to the specific embodiment disclosed but rather it is the intension to cover all modifications and alternate constructions falling within the spirit and scope of the invention as expressed in the appended claims.

Referring to the drawings, the reference character A designates a dual spindle veneer lathe having a frame including a pair of end frame members 10, 11 extending upwardly from a base member and within each of which end frame members is rotatably supported a pair of dual spindles 12, 13 and 14, 15, provided with spaced, axially aligned large and small chucks 16, 17, and 18, 19 between which a log L to be peeled is supported and by means of which it is rotated.

During the cutting or peeling operation, the log is rotated against a knife 25 which cuts or peels the veneer from the log. The knife 25 is carried by and forms a part of a knife and pressure bar assembly B supported on suitable ways on the adjoining sides of the end frame members 10, 11. During the peeling operation, the assembly B is movable towards the log in timed relation to its rotation. As the knife approaches the axis of rotation of the spindles the angle of the knife with respect to the log is varied. When the knife approaches close to the larger chucks 16 and 18, the large or outer spindles 12 and 14 upon which they are carried are retracted without interrupting the peeling operation which normally is continued until the knife is about to engage the smaller chucks 17 and 19. The latter position is the position in which the respective parts are shown in the drawings. In this position the peeling operation is completed, the knife and pressure bar assembly B is about to be retracted and the small spindles subsequently withdrawn to drop the log core.

The lathe A thus far referred to is well known in the art and may be any commercial available dual spindle veneer lathe, such as, the model M263 veneer lathe currently being manufactured by The Coe Manufacturing Company, the assignee of this application, and only those parts of the lathe are shown in the drawing and hereindescribed which are necessary to an understanding of the invention. See also United States Patent to Haumann, No. 3,198,226.

As previously mentioned, during the cutting or peeling operation the log tends to climb upward on the knife, etc., and in the preferred embodiment of the invention shown the log is supported or steadied intermediate its ends, when its diameter is such that it would otherwise flex or bend under the forces exerted thereon incident to the peeling of veneer therefrom, by apparatus designated generally by the reference character C forming a part of the lathe A and connected to the end frame members 10 and 11 thereof.

The apparatus C comprises a tubular member 30 opposite ends of which are welded to brackets 31 and 32 adjustably connected to members 33 and 34 suitably fixed to the top of the end frame members 10 and 11, respectively. The members 31 to 34 are formed of welded up plates and the members 31 and 32 are movably supported on the tops of the members 33 and 34 for adjustment in a horizontal plane and are fixedly connected thereto in a desired adjusted position thereon by screws extending through slots in the members 31 and 32 and threaded into suitably tapped apertures in the members 33 and 34. The tubular member 30 carries a support or back-up assembly, designated generally as S, pivotally supported on a shaft 35 located underneath the member 30 and rotatably supported in bearing assemblies 36, 37 and 38, detachably bolted to plates 40, 41 and 42, respectively, welded to the member 30. The bearings 36, 37 and 38 are connected to the plates 40, 41 and 42 adjacent to their free or lower ends. The shaft 35 forms a part of a follower or pilot assembly P and the assembly S is pivotally supported thereon by bearing assemblies 45 and 46 bolted to side plates 47 and 48, respectively, of a built-up frame or arm member 50 of the back-up assembly S. The frame or arm 50 is formed of plates and other structural members welded together.

The support or back-up assembly S comprises back-up roller assembly BR including two duplicate back-up rollers 60 and 61 rotatably supported on shafts 62 and 63, respectively, which shafts are fixed in triangular-shaped side members 64 and 65 pivoted upon a shaft 66 carried in the free ends of the side plates 47 and 48 of the frame or arm 50. The axes of the rollers 60 and 61 and the pivoted connection of the plates 64 and 65 with the arm 50 form an equilateral triangle with the last-mentioned axis located at the apex. The back-up rollers 60 and 61 provide a log support abutment surface or surfaces adapted to engage a log being peeled above and at the side opposite to the knife 25.

The log support assembly S is adapted to be oscillated about the shaft 35 as a pivot by a double acting reciprocating-type fluid actuated motor H comprising a cylinder 70 pivotally connected by trunnions 71 and 72 rotatably supported in bearing members 73 and 74 fixed to plates 75 and 76 welded to projections forwardly of the member 30. The motor M includes the usual piston rod 80, the projecting end of which is pivotally connected by a pin 81 to the upper part of two plates 82 and 83 welded to the top and back of a member 84 forming a part of the frame 50 and extending between the side plates 47 and 48 of the frame 50 of the back-up assembly S.

The flow of pressure fluid, preferably oil, to and from the motor M is controlled by a valve V the housing 85 of which is fixed to the member 84. The plunger or valve spool 90 of the valve V projects downwardly, as viewed in the drawings, through the lower end of the valve housing 85. The plunger or valve spool 90 of the valve V is spring biased in a downwardly direction by a compression spring 91, and the lower end thereof is provided with a roller 92 which engages the upper surface of a member 93 of the pilot or follower assembly P.

In addition to the previously mentioned shaft 35 and member 93, the pilot or follower assembly P comprises two built-up lever or arm members 100 and 101 keyed to the shaft 35. The tracer member 100 is keyed to the shaft 35 adjacent to its left-hand end, as viewed in FIG. 1 and includes a split hub 102 adapted to be clamped to the shaft 35 by a clamp screw 103. The construction is such that the member 100 may be adjusted along the shaft 35 if the lathe is used to peel logs shorter than the log L shown which is the maximum length of log which the lathe illustrated will peel. The free end of the arm 100 has pivotally connected thereto a follower roller assembly FR comprising duplicate rollers 104 and 105 rotatable upon shafts 106 and 107 carried by triangular-shaped plates 108 and 109. The plates 108 and 109 are pivotally connected by a pin 111 to a sleeve member 12 fixed to the end of the tracer or follower arm or member 100. The rollers 104 and 105 provide a control abutment surface or surfaces adapted to engage the log L adjacent to the left-hand chuck 17. The roller assemblies BR and FR are essentially duplicates of one another except for length. The back-up roller assembly BR is longer than the follower roller assembly FR. The rollers 60, 61, 104 and 105 are all of the same diameter but rollers 60 and 61 are usually much longer than the rollers 104 and 105. The axes of the rollers 60, 61 and 104, 105 are spaced equal distances from the respective pivotal connections of the plate members 64, 65 and the plate members 108, 109 with the frame or arm members 50 and 100, respectively. The axes about which the roller assemblies BR and FR pivot with respect to their supporting arms are equal distances from the axis of the shaft 35. The construction is such that when the rollers are in engagement with a straight log of uniform diameter from end to end the axes of the rollers 60 and 61 are aligned with the axes of the rollers 104 and 105, respectively. The axis about which the members 64 and 65 are pivotally connected to the frame or arm member 50 and the members 108 and 109 to the frame or arm member 100 are also aligned as are the log support and control abutment surfaces.

The second or valve lever or arm 101 of the follower or pilot assembly P is a weldment comprising base member 115 welded to the underside of a lever 116 welded to a split sleeve or hub 17 keyed to the shaft 35 between the side members 47 and 48 of the frame or lever 50 of the back-up or support assembly S and a member 118 welded to the free or projecting end of the members 115 and 116. The member 118 has a forwardly projecting part 119 of reduced height and a slot 120 opening into its front within which a worm wheel 124 is located. The worm gear 124 is threaded upon a screw shaft 125 projecting through aligned guide apertures in projecting portion 119 of the member 118. The screw shaft 125 is free to slide axially in the member 118 but is not loose therein.

The member 93 is welded upon the threaded shaft 125 and is adapted to be moved vertically, that is, toward and from the upper surface of the forwardly projecting part of the member 118 upon vertical movement of the shaft 125. The portion of the member 93 which overlies the forwardly projecting portion of the member 118 is rectangular in plane and the rear wall thereof engages the front wall of the member 118 which extends above the portion of reduced height thus preventing rotation of screw shaft 125. The worm wheel 124 is adapted to be rotated in opposite directions by a worm in mesh with and which worm is fixedly secured to a shaft 130 rotatably supported in a suitable aperture in the member 118 and a plate-like member 131 welded to the front projecting end of the member 118. The forward end of the shaft 130 is provided with a hand wheel 132 by which the shaft may be manually rotated and the back end thereof is operatively connected to a reversible electric motor 133 supported on a plate 134, which plate is in turn connected by a plate 135 to the underside of the plate 115 of the valve arm 101. The construction is such that as the valve arm 101 oscillates relative to the back-up assembly S, the valve spool or plunger 90 of the valve V reciprocates in the valve casing 85 to control hte flow of fluid pressure to and from the motor M in a manner hereinafter described.

Figure 2:
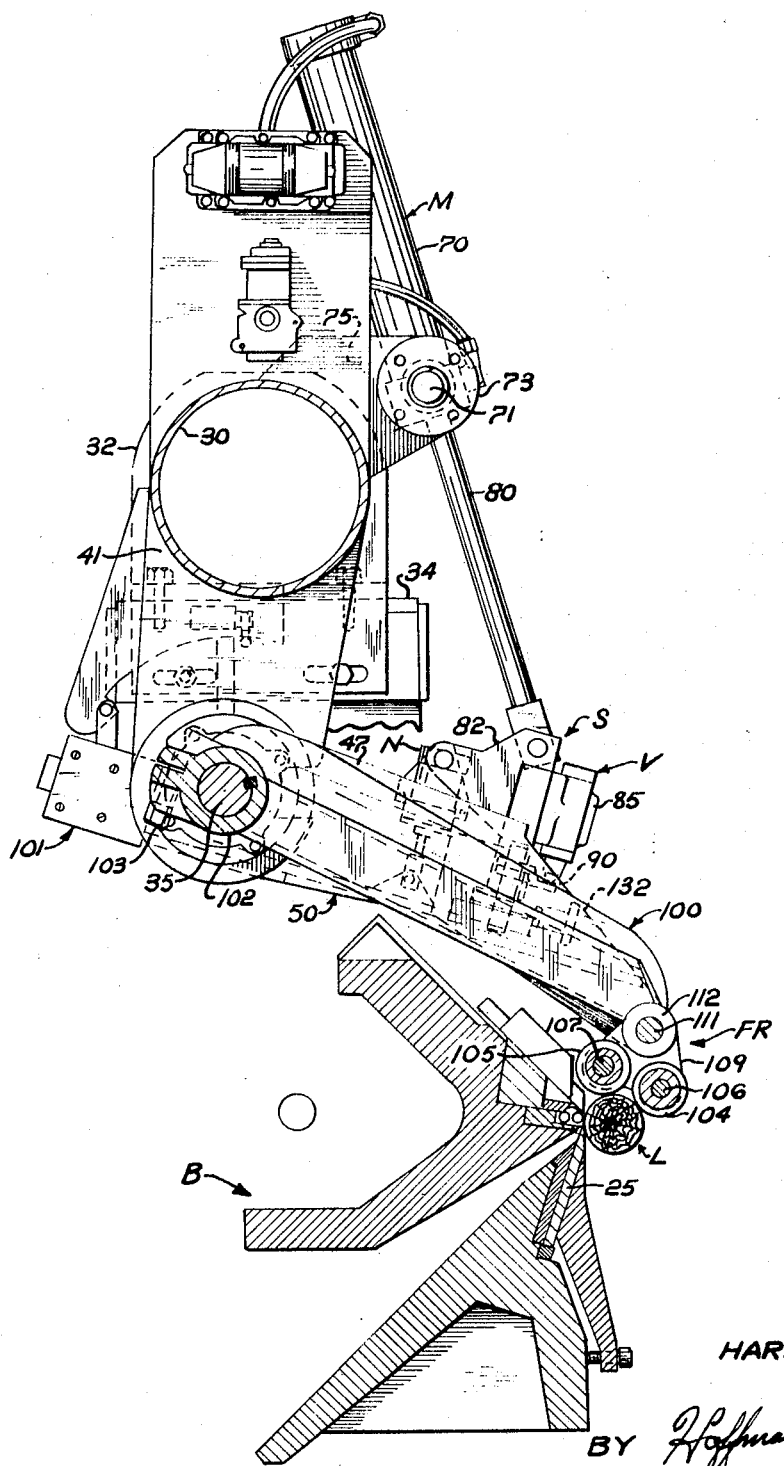
FIG. 2 is a sectional view approximately on lines 2—2 of FIG. 1.
Figure 3:
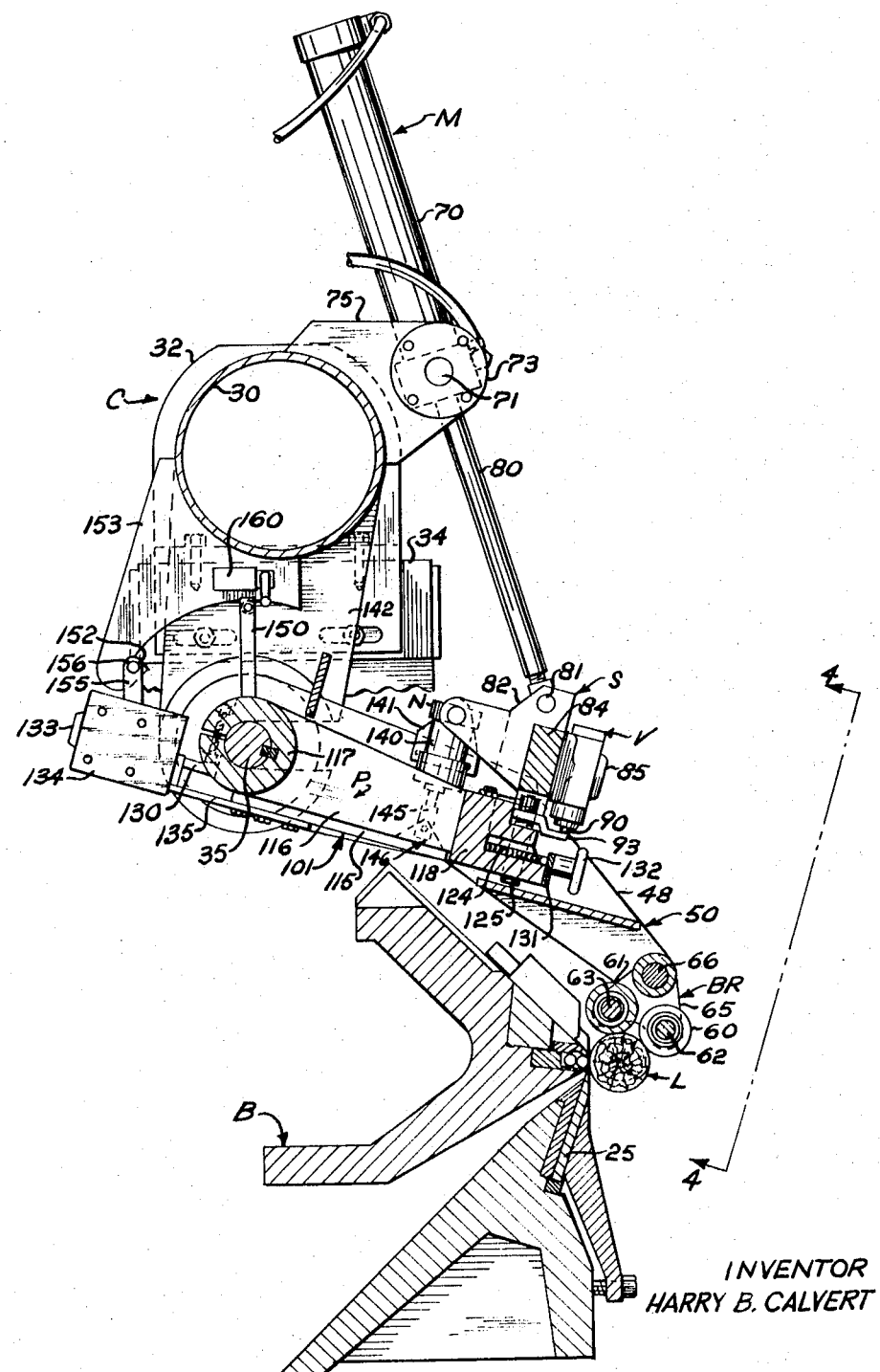
FIG. 3 is a sectional view approximately on lines 3—3 of FIG. 1.
Figure 4:
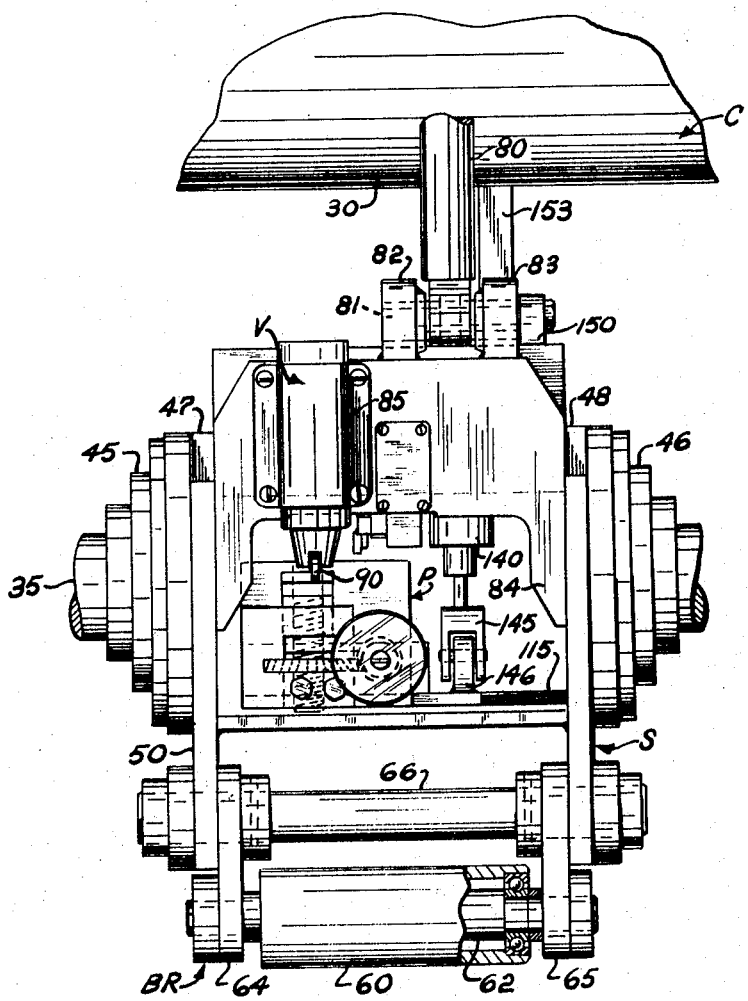
FIG. 4 is a fragmentary elevational view looking from the line 4—4 of FIG. 3.

The back-up assembly arm or frame 50 is connected to the valve arm 101 of the follower or pilot assembly P by single acting reciprocating-type fluid pressure motor N which, in the preferred embodiment, is an air operated motor. The motor N comprises a cylinder 140 pivotally connected to the frame or arm 50 by trunnions extending from opposite sides thereof and which are rotatably supported in rearwardly extending projection of the plate 82 and a plate or bracket 141 bolted to the side plate 48 of the arm or frame 50 and a piston rod 145 projecting through the lower end of the cylinder 140 and pivotally connected to a clevis-like member 146 welded to the upper side of the plate 115 at the right-hand side of the web or arm 116, as viewed in FIG. 1. The construction is such that when it is desired to raise the back-up assembly S and the follower or tracer assembly P, air is admitted to the motor N to move the arm 101 in a counterclockwise direction, as viewed in FIGS. 2 and 3, thus actuating the valve V to control the supply of fluid pressure to and from the motor M in the direction to cause the motor M to raise the back-up and pilot assemblies S and P. Movement of the assemblies referred to in the counterclockwise direction, as viewed in FIGS. 2 and 3, is limited by the engagement of a stop 150 welded to the hub 117 of the lever 101 with an abutment 152 formed on a plate 153 welded to the member 30. In the embodiment shown, movement of the assemblies S and P in the counterclockwise direction referred to, that is, in the direction to move the back-up roll and follower roll assemblies away from the axis of rotation of the lathe spindles can also be limited by the rotation of a pivoted intermediate stop 155 connected to the right-hand end of the shaft 156, the end of the shaft 156 upon which the stop 155 is fixed, is pivotally supported in the plate 153 and the other end thereof projects beyond the right-hand bracket 34 as viewed in FIG. 1 where it is provided with a hand grasp for manual movement of the stop 155 into and out of operating position. The right-hand end of the shaft 156, as viewed in FIG. 1, is pivotally connected in a suitable bracket on the rear side of the member 34.

The fluid and electrical systems for controlling the operation of the apparatus referred to will be described in connection with the operation of the lathe.

Figure 7:
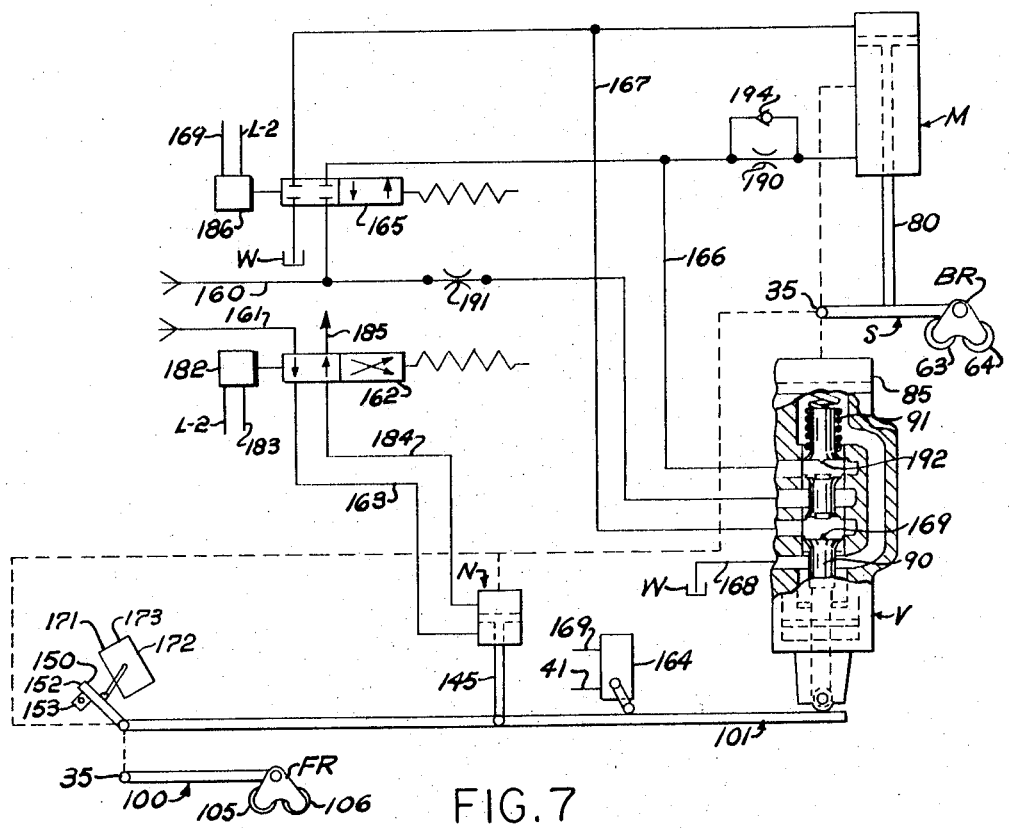
FIG. 7 is a schematic view illustrating hydraulic controls of the present invention.
Figure 8:
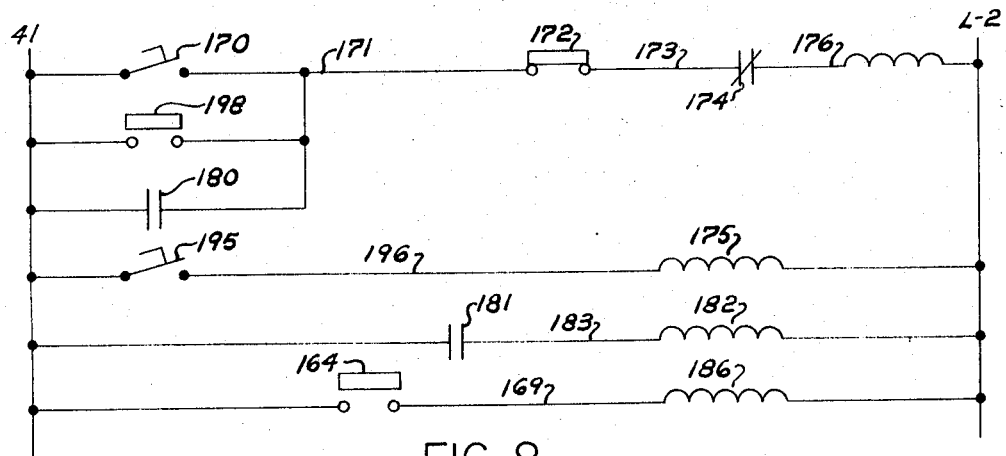
FIG. 8 is an electrical diagram illustrating the controls for the present invention.

Assuming that hydraulic fluid under high pressure is being supplied from a suitable source to conduit 160, that air under pressure is being supplied to conduit 161, that the pilot or follower and the back-up roll assemblies P and S are in their raised position, that a log previously loaded into the lathe has been rounded up, that the initial part of the peeling operation is in progress, and that the back-up apparatus is in its "up" or inoperative position, the control devices will then be in the operating positions shown in FIGS. 7 and 8. The air supply conduit 161 is connected through valve 162 to conduit 163 leading to the lower end of air motor N thus maintaining the stop arm 150 of the pilot or follower assembly P in engagement with abutment 152 or the end of member 155, the back-up roll assembly S is in a neutral position relative to the pilot assembly P with switch 164 open, spool 90 of the valve V in its neutral position, and valve 165 closed. The valve end of conduits 166 and 167 are closed at the valves preventing the flow of fluid from the motor M. Hydraulic fluid under pressure will be supplied to the lower end of the motor M by valve V if necessary to maintain the back-up assembly in its up position, because of leakage in the system, etc.

In the event back-up assembly S should drop slightly downward, movement of housing 85 of valve V relative to valve spool 90 would open the valve to connect supply conduit 160 to conduit 166 connected to the lower end of the cylinder of motor M. Simultaneously fluid would be allowed to escape to the sump W from the upper end of the motor through conduit 167 connected therewith and conduit 168 connecting valve V with the sump W. The initial opening of the valve V to connect conduit 167 with the sump is very gradual because it is through multiple V-shaped throttling grooves 169 in the valve spool.

When the peeling of the log has progressed to the point where the diameter of the log is such that it is desired to support or backup the log the operator closes the foot switch 170 establishing a circuit from the line 41 through the now closed switch 170, wire 171, normally closed contacts of switch 172, wire 173, normally closed contacts 174 of relay 175, wire 176, and operating solenoid of relay 177 to L–2 thus energizing relay 177 to close its normally open contacts 180 and 181. The closing of contacts 180 establishes a holding circuit for relay 177 allowing the operator to release switch 170. The closing of contacts 181 energizes solenoid 182 of valve 162 by establishing a circuit from line L–1 through contacts 181, wire 183 and solenoid 182 to line L–2.

Energization of solenoid 182 of valve 162 actuates the valve to reverse the direction of the flow of air therefrom and to supply air under pressure through conduit 184 to the upper end of the cylinder of motor N and connect the lower end of the cylinder to atmosphere through conduit 163 and an exhaust conduit 185. This moves the arm 101 of the follower assembly P in a clockwise direction relative to the back-up roll assembly S. The switch 164 remains open leaving the solenoid 186 of valve 165 de-energized with the valve 165 blocking both conduits 166 and 167 at valve 165. As the valve spool 90 drops in its housing 85 from its neutral position, the valve V opens allowing pressure fluid to flow to the upper end of motor M and exhaust from the lower end thereof. The maximum rate of flow of hydraulic fluid in the direction referred to may be restricted or controlled, if desired, by the inserting of flow regulators 190 and 191, such as, needle valves, in the conduits 166 and/or 167 at appropriate location such as the places shown in FIG. 7.

The pilot or follower and the back-up roll assemblies P and S continue to move down with the rolls 105 and 106 of the follower roll assembly FR leading the rolls 63 and 64 of the back-up roll assembly BR until the rolls 105 and 106 engage the log being peeled. When the rolls 105 and 106 engage the log downward movement of the follower assembly P stops but the back-up roll assembly S continues its downward movement. As the rolls 63 and 64 of the back-up roll assembly engage the log, the valve housing 85 moves down over the spool 90 which is now stationary until the valve spool 90 has been moved to its neutral position blocking the ends of conduits 166 and 167 connected to the valve V thereby preventing the escape of fluid from either end of the cylinder of motor M. Both the follower or tracer and the back-up rolls are against the log. As the log diameter is peeled smaller the tracer or pilot rolls follow it, allowing the vave spool 90 to move down in the housing 85 to open the valve admitting fluid under relatively high pressure to the upper end of motor M and allowing fluid to escape from the lower end of the motor. The opening of valve V to allow fluid to escape from the lower end of the cylinder of motor M is very gradual at the beginning because the initial opening is through V-shaped grooves 192 in the valve spool similar to the grooves 169 previously referred to. The back-up rolls 63 and 64 follow the tracing rolls 105 and 106 very closely, if not, exactly, and in turn the decreasing log diameter, without applying undue pressure against the log, provides a firm resistance to any tendency for the log to deflect upwardly, etc.

The optimum position for the back-up rolls 63 and 64 to engage the circumference of the log is usually about 10° to 45° to the right of vertical, as viewed in FIGS. 2 and 3, but will depend upon various conditions or factors such as knife position and sharpness, type or species and grade of logs being peeled, that is, hard or soft wood, etc., and provision is made for adjusting or changing the angular position at which the back-up rolls engage the log. In the embodiment shown this can be done by shifting the brackets 31 and 32 on their supports 33 and 34 to move the back-up apparatus in a horizontal plane transversely of the axis of the lathe spindles.

As the log being peeled reaches a desired diameter the large chucks 16 and 18 are withdrawn in the event the lathe is of the dual spindle type, as is the lathe illustrated. In any event the peeling is continued until the optimum minimum core diameter is reached at which time the knife and pressure bar assembly, etc., and the chucks holding the log are retracted. Initial retraction of the knife bar, etc., preferably precedes slightly the retraction of the chucks. As the chucks retract, the core log normally drops. The pilot and back-up assemblies, however, continue their downward movement a short distance until the stop or trip or stop arm 150 actuates limit switch 172 to open its normally closed contacts. The distance is sufficient to push the core log out of the chucks in the event it does not drop free of them as they are being retracted.

The opening of limit switch 172 breaks the holding circuit for relay 177 allowing its normally open contacts 180 and 181 to open. The opening of contacts 181 breaks the circuit for solenoid 182 allowing valve 162 to return to its normal position which is the position shown in FIG. 8, and wherein the air pressure supply line 161 is connected to conduit 163 leading to the lower end of motor N causing the motor to raise the follower assembly P including the arm 101 relative to the arm 50 thus shifting the spool or plunger 90 of the valve V upwardly in the housing 85 against the action of a spring 91 which normally urges it in the opposite direction, that is, in the direction to engage the member 93 of the arm 101. The raising of the spool 90 of the valve V connects the high pressure hydraulic fluid in supply conduit 160 to conduit 166 connected to the motor M underneath the piston thereof. Simultaneously conduit 167 connected to the upper end of motor M is connected through valve V and conduit 168 to the sump W thus causing or permitting the piston rod 80 of the motor M to lift the back-up assembly S, that is, move it in a counterclockwise direction about the shaft 35 as viewed in FIGS. 2 and 3. This upward movement of the back-up assembly S carries the pilot or follower assembly P with it and would be at a relatively slow rate because of the size of valve V, which is preferably one having a relatively small flow capacity and/or the flow adjusting valve 191 in hydraulic fluid supply conduit 160 connected to the valve V, assuming such a flow regulating valve is used, except for the fact that the raising of the pilot assembly arm 101 relative to the arm 50 of the back-up assembly as aforesaid also closes limit switch 164 energizing solenoid 186 of valve 165 to connect the hydraulic supply conduit 160 with conduit 166 and conduit 167 to sump W. Valve 165 is preferably one of relatively large capacity and the pilot and back-up assemblies are quickly returned to their "up" position, that is, until the trip or stop arm 150 strikes either the abutment 152 or the end of the member 155. In the event a flow restricting valve such as the valve 190 is employed a check valve by-pass such as the one designated 194 is used to permit rapid upward movement of the back-up rolls, etc.

When upward movement of the pilot assembly P is arrested by the stop arm 150 thereof abutting against one of the stop or abutments referred to continued upward movement of the back-up roll assemblies allows the valve spool 90 of valve V to move to vertical position and the switch 164 to open causing valve 165 to return to its normal position whereupon the conduits 166 and 167 are closed at the valves V and 165.

Anytime the back-up rolls are in operation the follower and back-up assemblies can be raised by the operator closing the pedal switch 195. This establishes a circuit from line 41 through switch 195, wire 196 and operating solenoid of relay 175 to line L–2 opening the normally-closed contacts 174 of the relay and de-energizing relay 177 which in turn de-energizes solenoid 182 allowing valve 162 to return to its normal position admitting air pressure to motor N which in turn raises the follower assembly P relative to the back-up roll assembly S and causes the motor M to raise both assemblies as previously described.

The relative position of the spool 90 of the valve V in its valve housing 85 for any given position of the back-up roll assembly S and the log support abutment surface or surfaces relative to the follower assembly P and the control abutment surface or surfaces can be varied or adjusted by rotating the worm gear 124 relative to the screw 125 thereby adjusting the member 93 relative to arm P thus causing the back-up rolls 63 and 64 or more particularly the log abutment surface or surfaces thereof to travel with or trail or lead the follower rolls 105 and 102 or the control abutment surface or surfaces thereof. This adjustment may be accomplished by manually rotating the shaft 130 by turning the hand wheel 132 or by energizing the reversible electric motor 133 to rotate in the desired direction. The controls for the motor 133, which are conventional, are preferably located at the lathe operator's station.

Adjusting the valve V so that the log support abutment surface of surfaces of the back-up rolls tend to lead the control abutment surface or surfaces of the follower or pilot rolls as they move in a downward direction causes the back-up rolls to apply a controlled pressure to the log, a desirable feature because of structural resiliency or deflection in the operating mechanism and compressibility of the hydraulic fluid due to gasses therein, etc.

Operation of the log support apparatus can be automatically initiated, if desired, as in an automatic lathe by employing a limit switch, such as the switch 198, in parallel circuit with the pedal switch 170 which limit switch is closed for an instant upon the occurrence of some condition in the lathe, such as the knife bar assembly reaching a predetermined position in its travel toward the axis of rotation of the lathe spindle or upon the retraction of the large spindles in a dual spindle-type lathe.

From the foregoing it is believed that it will be apparent that the objects heretofore enumerated and others have been accomplished and that there has been provided a new and improved apparatus for supporting a workpiece being turned and more particularly a log being peeled in such a manner that the diameter of the workpiece or log will be or will remain uniform or substantially uniform from end to end throughout the turning operation and that the device serves as an aid to smoother peeling of veneer. As previously mentioned, the invention is not limited to the particular construction illustrated and the modifications thereof heretofore mentioned, and it is the intention to hereby cover all adaptations, modifications and uses of the apparatus disclosed which come within the practice of those skilled in the art to which the invention relates and the scope of the appended claims.

What I claim is:

1. In a veneer lathe, a frame, spindle means rotatably supported in said frame and having chucks engageable with opposite ends of a log for supporting and rotating the log, a combination knife and pressure bar assembly movably carried by said frame, power means for moving said combination knife and pressure bar assembly toward the axis of rotation of said spindle means to peel veneer from the log, log support means including a first member movably carried by said frame and having at least one roller providing a first abutment surface engageable with the periphery of the log intermediate said chucks at a location spaced circumferentially about the axis of rotation of said spindle means from said combination knife and pressure bar assembly and movable with said first member transversely of the axis of rotation of said spindle means, hydraulic fluid-operated means for moving said first member transversely of the axis of rotation of said spindle means, means including a second member providing a second abutment surface engageable with the periphery of the log adjacent to one of said chucks and movable transversely of said axis of rotation for controlling the flow of hydraulic fluid to and from said pressure fluid-operated means to urge said first abutment surface to a given position relative to said second abutment surface, and means for varying said given position of said abutment surfaces.

2. In a veneer lathe, a frame, spindle means rotatably supported in said frame and having chucks engageable with opposite ends of a log for supporting and rotating the log, a combination knife and pressure bar assembly movably carried by said frame, power means for moving said combination knife and pressure bar assembly towards the axis of rotation of said spindle means to peel veneer from the log, a first member movably carried by said frame and having at least one roller providing a log support abutment surface engageable with the periphery of the log intermediate said chucks at a location spaced circumferentially about the axis of rotation of said spindle means from said combination knife and pressure bar assembly and movable with said first member transversely of said axis of rotation, hydraulic fluid-operated means for moving said first member transversely of the axis of rotation of said spindle means, a second member providing a control abutment surface engageable with the periphery of the log adjacent to one of said chucks and movable transversely of the axis of rotation of said spindle means, valve means having a first valve part connected to one of said members and a second valve part movable relative to said first valve part and connected to the other of said members for controlling the flow of hydraulic fluid to and from said fluid-operated means to cause said support abutment surface to follow the movement of said control abutment surface, and means for varying the position of said valve parts relative to one another for a given position of said abutment surfaces relative to one another transversely of the axis of rotation of said spindle means.

3. A work-steady apparatus for a veneer lathe having spaced spindles rotatably supported in a frame and provided with chucks engageable with opposite ends of a log for supporting and rotating a log and a combination knife and pressure bar assembly movable on the frame by power towards the axis of rotation of the spindles to peel veneer from a log supported therebetween: a carrier member adapted to be connected to the frame of the lathe; a first member movably connected to said carrier member and having at least one roller providing a log support abutment surface adapted to engage the periphery of a log carried between the chucks of a veneer lathe to which said carrier member is connected at a location spaced circumferentially about the axis of rotation of the spindles of the veneer lathe from the combination knife and pressure bar assembly and movable with said first member transversely of the axis of rotation of the spindles; hydraulic fluid-operated means for moving said first member transversely of the axis of rotation of the spindles of the veneer lathe; a second member providing a control abutment surface engageable with the periphery of the log adjacent to one of the chucks of the veneer lathe and movable transversely of the axis of rotation of the spindles; valve means having a first valve part connected to one of said members and a second valve part movable relative to said first valve part and connected to the other of said members for controlling the flow of hydraulic fluid to and from said fluid-operated means to cause said support abutment surface to follow the movement of said control abutment surface, and means for varying the position of said valve parts relative to one another for a given position of said abutment surfaces relative to one another transversely of the axis of rotation of the spindles of the lathe.

References Cited

UNITED STATES PATENTS

| 3,040,791 | 6/1962 | Fauchon | 144—209 |
| 3,078,887 | 2/1963 | Heth | 144—209 |

FOREIGN PATENTS

| 563,922 | 6/1957 | Italy. |

DONALD R. SCHRAN, Primary Examiner

PO-1050
(5/69)

UNITED STATES PATENT OFFICE
CERTIFICATE OF CORRECTION

Patent No. 3,455,354    Dated July 15, 1969

Inventor(s) H. B. Calvert

It is certified that error appears in the above-identified patent and that said Letters Patent are hereby corrected as shown below:

Column 1, line 33, "workk" should be --work--;
          line 63, "deired" should be --desired--;
          line 70, "spindle" should be --spindles--.

Column 2, line 41, "intension" should be --intention--;
          line 43, "intension" should be --intention--.

Column 5, line 9, "hte" should be --the--;
          line 43, "the" (second occurrence) should be --a--.

Column 8, line 35, "of" (first occurrence) should be --or--.

SIGNED AND
SEALED
MAR 24 1970

(SEAL)
Attest:

Edward M. Fletcher, Jr.
Attesting Officer

WILLIAM E. SCHUYLER, JR.
Commissioner of Patents